(12) United States Patent
Shi

(10) Patent No.: US 6,895,144 B2
(45) Date of Patent: May 17, 2005

(54) STRUCTURE AND METHOD FOR MANUFACTURING COMPACT OPTICAL POWER MONITORS OF HIGHLY RELIABLE PERFORMANCE

(75) Inventor: Zhouzheng Shi, Union City, CA (US)

(73) Assignee: Pactonix, Inc., Fremont, CA (US)

( * ) Notice: Subject to any disclaimer, the term of this patent is extended or adjusted under 35 U.S.C. 154(b) by 258 days.

(21) Appl. No.: 10/191,170

(22) Filed: Jul. 8, 2002

(65) Prior Publication Data
US 2004/0179789 A1 Sep. 16, 2004

Related U.S. Application Data

(60) Provisional application No. 60/364,983, filed on Mar. 15, 2002.

(51) Int. Cl.[7] .............................. G02B 6/32; G02B 6/42
(52) U.S. Cl. ............................ 385/33; 385/88; 385/93; 385/90; 385/34
(58) Field of Search .......................... 385/25, 33, 34, 385/47, 48, 92, 93, 88, 90

(56) References Cited

U.S. PATENT DOCUMENTS

| 5,500,768 | A | * | 3/1996 | Doggett et al. | ............. | 359/652 |
|---|---|---|---|---|---|---|
| 5,841,562 | A | * | 11/1998 | Rangwala et al. | .......... | 398/139 |
| 5,857,048 | A | * | 1/1999 | Feuer et al. | ................ | 385/88 |
| 6,282,339 | B1 | * | 8/2001 | Zheng | .......................... | 385/34 |
| 6,584,249 | B1 | * | 6/2003 | Gu et al. | ....................... | 385/47 |
| 6,654,518 | B1 | * | 11/2003 | Liu | ............................. | 385/34 |
| 6,767,139 | B2 | * | 7/2004 | Brun et al. | .................... | 385/84 |

* cited by examiner

Primary Examiner—Akm Enayet Ullah
Assistant Examiner—Omar Rojas
(74) Attorney, Agent, or Firm—Bo-In Lin

(57) ABSTRACT

A new low-cost, highly reliable and compact optical power monitor is manufactured with simplified structure and improved configurations that require only lateral position adjustment for input/output beam alignment. A compact size is achieved by employing prefabricated housing containing a highly effective focus lens placed at fixed position relative to an optical sensor, e.g., a photodiode. The prefabricated housing further function as a seal housing for direct plugging into a holding tube fitting seamlessly to a GRIN lens to focus the tapped collimated beam to the photo sensor thus greatly simplify the manufacturing processes without alignment requirements. Thermal stability and reliable performance is achieved by applying multiple-layered optical reflection-transmission coating directly onto the end surface of a GRIN lens for tapping a small portion of the collimated beam onto the focus lens and the photo sensor. The insertion loss can be conveniently minimized by laterally shifting the relative position of a dual fiber ferrule and the GRIN lens without complicate angular adjustments. A power monitor with compact size, high damage threshold, low manufacture cost and high performance stability is provided for convenient implementation in new and existing optical systems.

17 Claims, 3 Drawing Sheets

STRUCTURE AND METHOD FOR MANUFACTURING COMPACT OPTICAL POWER MONITORS OF HIGHLY RELIABLE PERFORMANCE

This Formal Application claims a Priority Date of Mar. 15, 2002 benefited from a Provisional Application 60/364,983 filed by the same Applicant of this Application on Mar. 15, 2002.

FIELD OF THE INVENTION

This invention relates generally to a device configuration and method for making optical power monitors. More particularly, this invention relates to a simplified device configuration and method for manufacturing optical monitor to provide reliable performance.

BACKGROUND OF THE INVENTION

A technical challenge is faced by those of ordinary skill in the art of designing and manufacturing optical devices to provide compact and reliable optical sensing and monitoring devices including power monitors with application versatility that can be conveniently implemented in different optical systems to carry out the self monitoring and diagnostic functions. Specifically, as the optical network communication systems are more broadly employed to perform signal transmissions with higher bandwidths while various optical systems are becoming more complicate, the maintenance and trouble shooting of the optical systems become more difficult. For the purpose of reducing communication downtime and the costs required for system maintenance, diagnoses and repairs, there are ever increasing demands of "smart" systems provided with the self-monitoring, diagnostic and even self-correcting functions. A first step moving toward such systems is to introduce more sensing and monitoring devices in different optical system to carry out continuous sensing and detections of system and operation conditions. The sensor and monitors are implemented not only in the new systems but often are also required in the existing systems as well. Installation of sensors and monitors into existing systems often requires the use of smaller size sensors and monitors with broader range of operation versatility to fit into the existing configurations and operation conditions. Conventional techniques of optical sensing and monitoring devices are not able to provide the sensors and monitors with sufficient compactness, versatility and reliability, including the optical power monitors, suitable for such applications.

For these reasons, there is still a need in the art of design and manufacture of optical power monitors with smaller size, more operational versatilities and higher reliability to overcome the difficulties discussed above. Specifically, an improved and simplified configuration and method for making smaller and reliable optical power monitors with reduced production cost are required.

SUMMARY OF THE PRESENT INVENTION

It is therefore an object of the present invention to provide a new and improved simplified and reliable configuration and manufacturing method to provide compact and reliable power monitor device such that the above-mentioned difficulties and limitation can be resolved. This invention discloses a method to simplify the manufacture processes by forming the tapping layer as optical splitting/tapping layer directly on the GRIN lens without alignment and assembling processes. Furthermore, the new and improved configuration and manufacture method take advantage of the optical path deviations between incident/reflection beams through a GRIN lens when there is a small linear shift between the optical axes of the fiber pigtail and GRIN lens. More reliable power monitor device with reduced insertion loss can be achieved with new and improved alignment method implemented with a set of holding tubes to achieve minimum insertion loss between the incident and reflective beams.

Specifically, it is an object of the present invention to provide a simple and reliable device to sample and monitor signals in an optical system. The power monitor is implemented with a filter-centered packaging design to achieve high environmental stability. Integration of the tapping and detection elements is implemented as part of the design to achieve a compact device configuration and to simplify the processes of device manufacture. The new and improved configuration also utilizes concurrent light collecting and focusing functions to improve the signal collection efficiency. The concurrent light collecting and focusing unit is packaged as part of a hermetically sealed sensor housing to provide flexibility of selecting sensors with various degrees of sensitivities and response time. The power-sensing device disclosed in this invention is therefore useful not only for signal intensity detection but also for other broader ranges of applications such as data quality analyses. The new and improved device as disclosed in this invention thus provide several key advantages including but not limited to ultra compactness, broad versatility, long term device dependability and reliability, and design flexibility to fit into wide varieties of existing optical systems. The simplified configuration of the device as disclosed in this invention further streamline the manufacturing processes and reduce the production cost of the power sensing devices.

Briefly, in a preferred embodiment, the present invention discloses a new optical power monitor. The power monitor includes a collimator for collimating an incident light into a collimated beam. The power monitor further includes a beam splitter/tapping layer for transmitting a tapped portion of the collimated beam through the splitter/tapping layer for detecting an optical intensity. The coated splitter/tapping layer on the collimator further reflects a remaining portion of the collimated beam back to another optical transmitting media for continuous optical transmission.

This invention further discloses in a preferred embodiment, a method for monitoring an optical power. The method includes the steps of A) Employing a collimating means for collimating an incident light into a collimated beam. And, step B) of coating a splitter/tapping layer onto the collimating means for transmitting a tapped portion of the collimated beam therethrough for measuring and monitoring an optical power. In a preferred embodiment, the method further includes a step of receiving the incident optical beam through an input optical port of a dual fiber ferrule for projecting to the collimating means and receiving an output optical beam reflected from the splitter/tapping layer through an output optical port of the dual fiber ferrule. In another preferred embodiment, the method further includes a step of receiving the tapped portion of the collimated beam from the beam splitting/tapping layer into an optical signal detecting means for detecting an optical intensity.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENT

Figure 1:
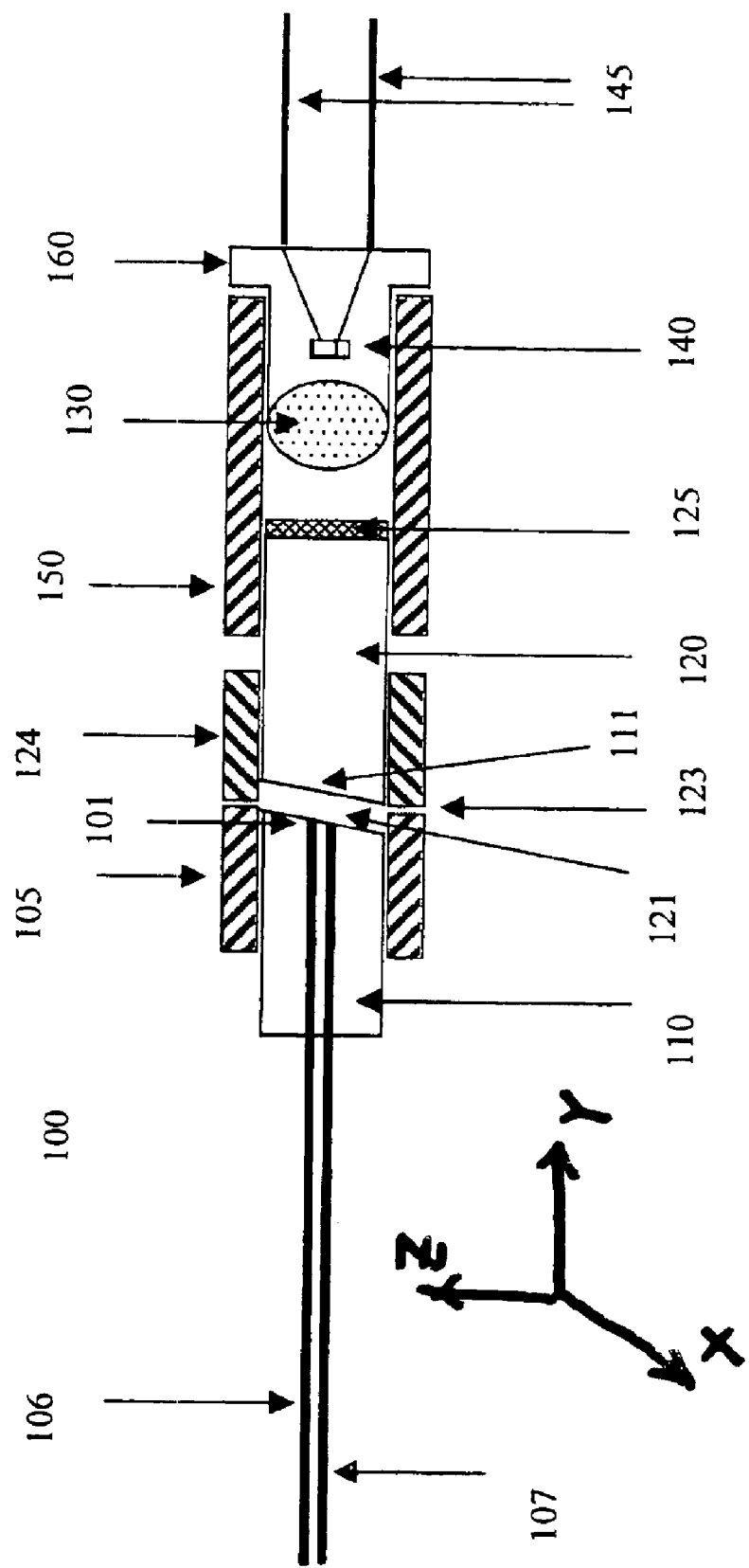
FIG. 1 is a cross sectional view of a schematic diagram showing the structure of a power monitor of this invention.

Referring to FIG. 1 for a preferred embodiment of an optical power monitor 100 of this invention. The improved power monitor 100 includes a dual fiber ferrule 110 to receive an input beam from an input optical fiber 106 and projecting an output beam from an output optical fiber 107. The input beam received from the input optical fiber 106 is projected into a beam collimator 120, e.g., a GRIN lens 120 coated with a filter coating 125. The filter coating 125 functions as a beam splitting-taping filter to transmit a tapped portion of the beam through a focus lens 130 onto a photo-detector, e.g., a photodiode 140 for measuring the intensity of the beam received form the input optical fiber 106. The splitting-tapping filter 125 further reflect a major portion of the beam back through the GRIN lens 120 onto the output optical fiber 107 as an output optical beam. The splitting-tapping filter 125 is formed as a multiple-layered coating deposited onto the focusing surface of the GRIN lens 120 to maximize the thermal stability and to reduce the optical energy loss thus increasing the optical damage threshold. By coating the splitting-tapping filter 125 directly onto the GRIN lens 125 further simplifies the device structure and strengthens the mechanical integrity of the device and eliminates an alignment requirement between the GRIN lens 120 and a separate optical filter in the case a separate reflecting-tapping device is employed instead of the multi-layered coating filter. The ratio of the light splitting can be adjusted to accommodate different levels of photoelectric signal intensity and total optical signal intensity loss. Typically, the multi-layered filter coating is formed to generate a tapped signal in the range of 1% to 10% of the initial beam intensity.

The face-to-face end surfaces 101 and 111 of the dual fiber ferrule 110 and the GRIN lens 120 respectively are arranged as parallel surfaces with an incline angle θ where θ is eight degrees, i.e., 8°, to increase the return losses. Both of these end surfaces 101 and 111 are coated with anti-reflection multi-layered coating to reduce the optical losses in the transmission of the optical signal through these inclined surfaces. In order to adjust for minimizing the signal loss, the dual optical fiber ferrule 110 and the GRIN lens 120 are held in two holding tubes 105 and 124 respectively. These two holding tubes 105 and 124 have parallel interface to assure that there are only lateral linear position adjustments are made between the GRIN lens 120 and the dual fiber ferrule 110. There is an air gap 121 between the dual fiber ferrule 105 and the GRIN lens 120 for focusing optimization. A very small gap 123 between these two holding tubes allows freedom of lateral movements between two holding tubes 105 and 124. Held by these two holding tubes 105 and 124, the relative position between the GRIN lens 120 and the dual fiber ferrule 110 is adjusted along two linear directions without relative angular adjustments thus significantly simplify the alignment processes. These two linear directions are along the optical axis, i.e., the X-axis and the Y-axis perpendicular to the optical axis, i.e., the Z-axis, to minimize the optical loss between the input port 106 and the output port 107.

Figure 2:
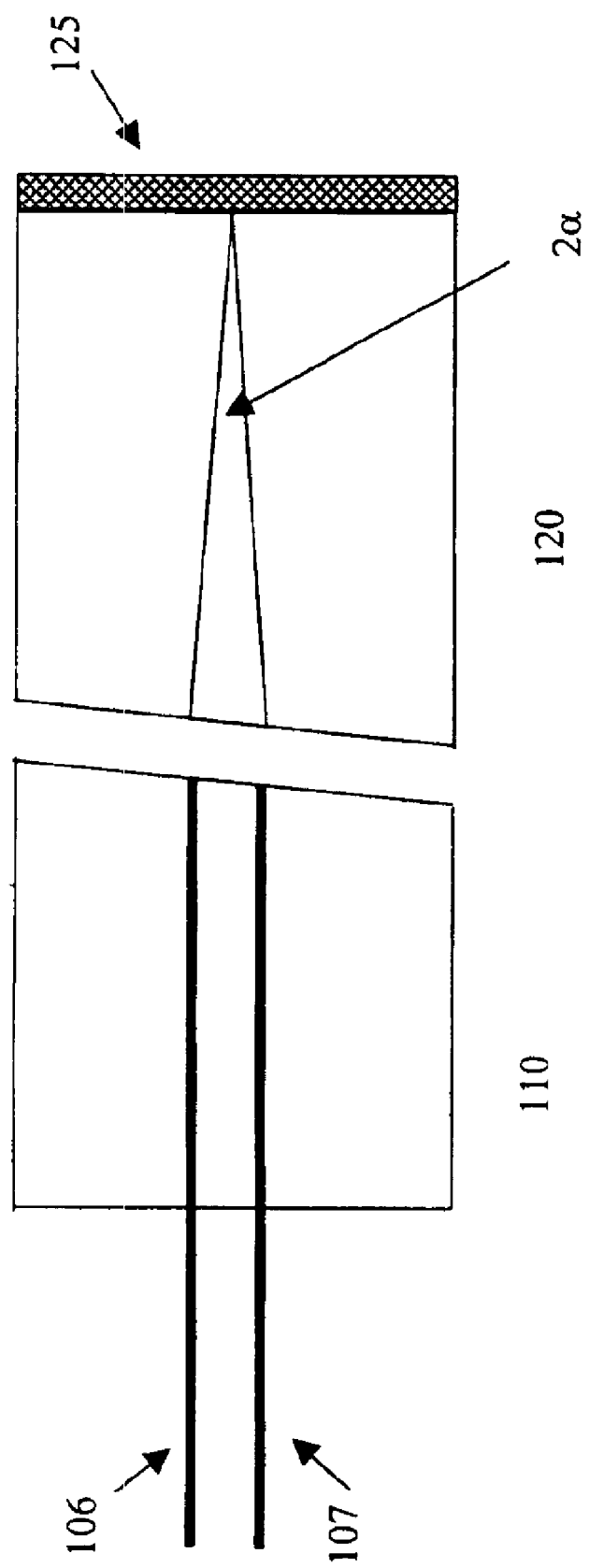
FIG. 2 is a schematic diagram for showing vertical shift between two holding tubes for adjusting the relative position of the dual fiber ferrule and the GRIN lens to adjust the input and output beam projections.

FIG. 2 showed the alignment schematic. The relative movement between dual fiber ferrule 105 and GRIN lens 120 along the principle axis Z contributes to the focusing condition adjustments. Meanwhile, the relative lateral movements in the plane that contains X-axis and Y-axis change the angle between collimated incident beam and principle axis Z. Therefore, the relative position of incident beam and output beam can be adjusted by 3-dimention alignment. In a preferred embodiment, the separation between the input and output optical fiber 106 and 107 is about 125 $\mu$m. The angle between the direction of the light beam emitted from the splitting-tapping filter coating 125 and the principle axis of the device along the Z-axis α is about 1.8°.

Referring to FIG. 1 again, for the purpose of increasing the structure integrity, a third holding tube 150 is holding the GRIN lens and the focus lens 140. The holding tube contained also a photodiode 140 that has a hermetic sealing metal housing 160 to seal the holding tube and the photo-diode 140 from the rear end of the holding tube 150. The physical size of active area of the sensor determines the dark current and the capacitance and these functional parameters also respectively affect the signal to noise ratio (S/N) and the analog response bandwidth. In order to achieve higher S/N ratio and fast response, it is desirable to lower the capacitance and the dark current and in turn, that can be achieved by reducing the active area of the photodiode 140. However, larger active area of the photodiode 140 can increase the overall response of the detector since more area will be illuminated. A balanced approach is to achieve adequate S/N ratio and response speed up to 2 GHz by adjusting the active area in the range from 50 $\mu$m to 100 $\mu$m in diameter. For a specific embodiment, the beam size of the light emitted from the beam splitting-tapping filter 125 is around 300 to 500 $\mu$m in diameter. In order to produce a compact power-monitoring device, it is necessary to apply a focus lens 130 with a short focus length to reduce the size of the detector 140 and the optical path from the splitting-tapping filter 125 to the detector 140. One specific configuration as shown in FIG. 1 is to use a short focus lens 130 that is part of the hermetically sealed house 160. A silica ball lens is implemented in a preferred embodiment to obtain low cost and good performance. To further reduce the space requirement for an even more compact power monitor, a specially designed aspherical lens may also be employed.

By using the holding tube 150 and the seal housing 160, fixing the focus lens 130 and the photodiode 140 at fixed locations within the seal housing 160, a self-aligned configuration is provided that greatly simplify the manufacture processes. The time and cost of manufacture is reduced and better structural integrity and product reliability is also achieved. As the tapped beam is focused onto the photodiode 140, the photo energy is converted into electric energy by generating corresponding amount of photoelectric current that can be converted directly as light intensity measurement through two electrodes 145. The photo-detector 140 can be further integrated by providing preamplifier onto the photo sensor chips to allow for even more flexibilities to process the tapped optical signal.

Figure 3:
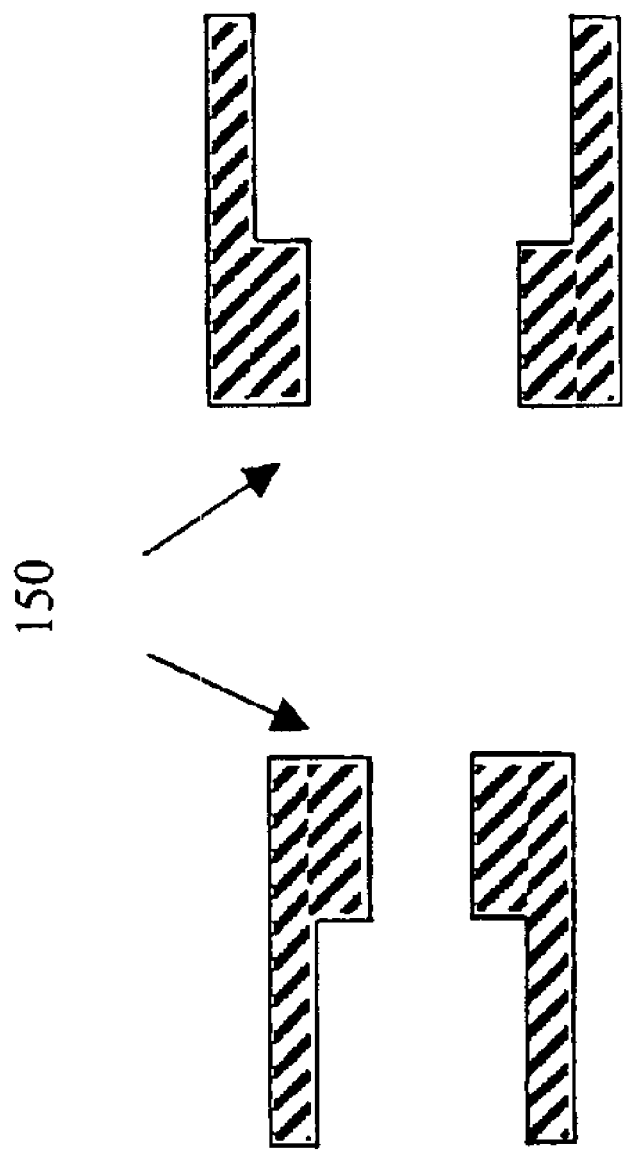
FIG. 3 is cross sectional view of two alternate shapes of holding tubes for housing and holding different sizes of focusing and sensing units.

According to FIGS. 1 to 3 and above descriptions, this invention discloses an optical power monitor. The power monitor includes a collimating means 120 for collimating an incident light into a collimated beam. The power monitor further includes a beam splitter/tapping means for transmitting a tapped portion of the collimated beam therethrough for measuring and monitoring an optical power wherein the beam splitter/tapping means comprising a splitter/tapping layer 125 coated onto the collimating means. In a preferred embodiment, the power monitor further includes a dual fiber ferrule 110 having an input optical port 106 for receiving an incident optical beam to project to the collimating means 120, the dual fiber ferrule further having an output optical port 107 for receiving an output optical beam reflected from the splitter/tapping means. In another preferred embodiment, the power monitor further includes an optical signal detecting means 140 for receiving the tapped portion of the collimated beam from the beam splitting/tapping layer for detecting an optical intensity. In another preferred embodiment, the optical signal detecting means further includes a focal lens 130 for focusing the tapped portion of the collimated beam onto a photodiode 140 for detecting an optical intensity. In another preferred embodiment, the power monitor further includes a first holding tube 105 for holding the dual fiber ferrule 110 and a second holding tube 124 for holding the collimating means 120 wherein the first holding tube and second holding tubes having a lateral position adjustment gap for minimizing an optical loss of the output optical beam reflected from the splitter/tapping means. In another preferred embodiment, the power monitor further includes a third holding tube 150 for holing the collimating means and the optical signal detecting means 140 for securely fixing a relative position therein. In another preferred embodiment, the power monitor further includes a seal housing 160 for sealing a rear opening of the third holding tube opposite the collimating means wherein the seal housing holds the focal lens 130 and the photodiode 140 at fixed positions for plugging and sealing the rear opening and placing the focal lens substantially at an optimal position relative to the splitting/tapping layer. In another preferred embodiment, the focal lens is a silica ball lens. In another preferred embodiment, the focal lens is an aspherical lens. In a preferred embodiment, the collimating means is a GRIN lens having an inclined lens surface relative to a main optical axis of the GRIN lens and the inclined lens surface facing a parallel ferrule surface of the dual fiber ferrule wherein the lens surface is disposed at a gap-distance from the parallel ferrule surface for achieving a focus optimization.

This invention further discloses a method for monitoring an optical power. The method includes the steps of A) Employing a collimating means for collimating an incident light into a collimated beam. And, step B) of coating a splitter/tapping layer onto the collimating means for transmitting a tapped portion of the collimated beam therethrough for measuring and monitoring an optical power. In a preferred embodiment, the method further includes a step of receiving the incident optical beam through an input optical port of a dual fiber ferrule for projecting to the collimating means and receiving an output optical beam reflected from the splitter/tapping layer through an output optical port of the dual fiber ferrule. In another preferred embodiment, the method further includes a step of receiving the tapped portion of the collimated beam from the beam splitting/tapping layer into an optical signal detecting means for detecting an optical intensity.

In a preferred embodiment, this invention further discloses a method of monitoring an optical power. The method includes the steps of A) employing a collimating and tapping means for tapping a tapped portion of an optical signal to a focusing and detecting means for detecting the tapped portion of the optical signal. B) Employing a holding tube for securely holding and fixing the collimating and taping means at a fixed relative position from the focusing and detecting means. And, step C) employing a seal housing for sealing a rear opening of the holding tube opposite the collimating and tapping means and holding the focusing and detecting means in the seal housing for plugging and sealing the rear opening and placing at an optimal position relative to the collimating and tapping means.

This invention further discloses a seal housing 160 for searing a rear tube opening of a holding tube 150. The seal housing 160 includes at least two optical components held by the seal housing at fixed positions for plugging and sealing the rear tube opening provided to proper function with a third optical component inserting from a front tube opening opposite the rear tube opening. In a preferred embodiment, the seal housing holding a focus lens 130 and a photo-sensor 140 at fixed positions. In another preferred embodiment, the holding tube 150 is provided for holding a GRIN lens 120 placed therein from a front opening of the holding tube 150.

The holding tubes 105, 124 and 150 are securely attached to the dual fiber ferrule 110, the GRIN lens 120 and the GRIN lens and the seal housing 160 respectively by applying thermally cured epoxy for long term reliable structure integrity and operation stability. The end surfaces between the holding tubes 105 and 124 are also securely attached together with properly applied adhesive material such as epoxy for fixing the relative position for minimizing the optical losses. The thermal stability and long term performance reliability of the power monitor 100 is dependent on several structural and functional parameters. Specifically, these parameters are 1) the degree of fitness between the holding tubes and the dual fiber ferrule and the GRIN lens, 2) the length of the holding tubes 105 and 124, 3) the quality of the end surfaces and the strength of mutual attachment of the holding tubes, 4) the uniformity of the interface between the holding tubes 105 and 124, 5) the material of the holding tubes 105, 124 and 150, 6) the types and the amount of the adhesive applied; 7) the pre-treatment of the end-surfaces to function as bonding surfaces; and 8) the settlement and curing processes of the adhesives for bonding the holding tubes thus bonding the device together. These interfaces and quality of attachment are greatly improved according to the configuration disclosed in this invention because the simple and linear interface configuration without curved or irregular shaped interface surfaces with proper freedom of movement for flexible position adjustment and conveniently application of adhesive materials on these interfaces.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An optical power monitor comprising:
   a collimating means for collimating an incident light into a collimated beam;
   a dual fiber ferrule having an input optical port for receiving an incident optical beam to project to said collimating means, said dual fiber ferrule further having an output optical port for receiving an output optical beam reflected from said splitter/tapping means;
   a beam splitter/tapping means for transmitting a tapped portion of said collimated beam therethrough for measuring and monitoring an optical power wherein said beam splitter/tapping means comprising a splitter/tapping layer coated onto said collimating means;

an optical signal detecting means for receiving said tapped portion of said collimated beam from said beam splitting/tapping layer for detecting an optical intensity; and a holding tube for holding said collimating means and said optical signal detecting means for securely fixing a relative position therein.

2. The optical power monitor of claim 1 wherein:

said optical signal detecting means further includes a focal lens for focusing said tapped portion of said collimated beam onto a photodiode for detecting an optical intensity.

3. The optical power monitor of claim 1 further comprising:

a second holding tube for holding said dual fiber ferrule and a third holding tube for holding said collimating means wherein said second holding tube and third holding tubes having a lateral position adjustment gap for minimizing an optical loss of said output optical beam reflected from said splitter/tapping means.

4. An optical power monitor comprising:

a collimating means for collimating an incident light into a collimated beam;

a beam splitter/tapping means for transmitting a tapped portion of said collimated beam therethrough for measuring and monitoring an optical power wherein said beam splitter/tapping means comprising a splitter/tapping layer coated onto said collimating means;

an optical signal detecting means for receiving said tapped portion of said collimated beam from said beam splitting/tapping layer for detecting an optical intensity; and a holding tube for holding said collimating means and said optical signal detecting means for securely fixing a relative position therein.

5. The optical power monitor of claim 2 further comprising:

a seal housing for sealing a rear opening of said holding tube opposite said collimating means wherein said seal housing holds said focal lens and said photodiode at fixed positions for plugging and sealing said rear opening and placing said focal lens substantially at an optimal position relative to said splitting/tapping layer.

6. The optical power monitor of claim 2 wherein:

said focal lens is a silica ball lens.

7. The optical power monitor of claim 2 wherein:

said focal lens is an aspherical lens.

8. The optical power monitor of claim 1 wherein:

said collimating means is a GRIN lens having an inclined lens surface relative to a main optical axis of said GRIN lens and said inclined lens surface facing a parallel ferrule surface of said dual fiber ferrule wherein said lens surface is disposed at a gap-distance from said parallel ferrule surface for achieving a focus optimization.

9. A method for monitoring an optical power comprising:

employing a collimating means for collimating an incident light into a collimated beam;

receiving said incident optical beam through an input optical port of a dual fiber ferrule for projecting to said collimating means and receiving an output optical beam reflected from said splitter/tapping layer through an output optical port of said dual fiber ferrule;

coating a splitter/tapping layer onto said collimating means for transmitting a tapped portion of said collimated beam therethrough for measuring and monitoring an optical power;

receiving said tapped portion of said collimated beam from said beam splitting/tapping layer into an optical signal detecting means for detecting an optical intensity; and employing a holding tube for holding said collimating means and said optical signal detecting means for securely fixing a relative position therein.

10. The method of claim 9 wherein:

said step of receiving tapped portion of said collimated beam into said optical signal detecting means further includes a step of receiving said tapped portion of said collimated beam into focal lens for focusing said tapped portion of said collimated beam onto a photodiode for detecting an optical intensity.

11. The method of claim 9 further comprising:

employing a second holding tube for holding said dual fiber ferrule and employing a third holding tube for holding said collimating means; and adjusting a lateral positions of said second holding tube and third holding tubes for minimizing an optical loss of said output optical beam reflected from said splitter/tapping means.

12. A method for monitoring an optical power comprising:

employing a collimating means for collimating an incident light into a collimated beam;

coating a splitter/tapping layer onto said collimating means for transmitting a tapped portion of said collimated beam therethrough for measuring and monitoring an optical power;

receiving said tapped portion of said collimated beam from said beam splitting/tapping layer into an optical signal detecting means for detecting an optical intensity; and employing a holding tube for holding said collimating means and said optical signal detecting means for securely fixing a relative position therein.

13. The method of claim 10 further comprising:

employing a seal housing for sealing a rear opening of said holding tube opposite said collimating means and holding said focal lens and said photodiode in said seal housing at fixed positions for plugging and sealing said rear opening and placing said focal lens substantially at an optimal position relative to said splitting/tapping layer.

14. The method of claim 10 wherein:

said step of receiving said tapped portion of said collimated beam into a focal lens is a step of receiving said tapped portion into a silica ball lens.

15. The method of claim 10 wherein:

said step of receiving said tapped portion of said collimated beam into a focal lens is a step of receiving said tapped portion into an aspherical lens.

16. The method of claim 9 wherein:

said step of employing said collimating means is a step of employing a GRIN lens having an inclined lens surface relative to a main optical axis of said GRIN lens for facing a parallel ferrule surface of said dual fiber ferrule; and disposing said lens surface at a gap-distance from said parallel ferrule surface for achieving a focus optimization.

17. A method of monitoring an optical power comprising:

employing a collimating and tapping means for tapping a tapped portion of an optical signal to a focusing and detecting means for detecting said tapped portion of said optical signal;

employing a holding tube for securely holding and fixing said collimating and tapping means at a fixed relative position from said focusing and detecting means; and employing a seal housing for sealing a rear opening of said holding tube opposite said collimating and tapping means and holding said focusing and detecting means in said seal housing for plugging and sealing said rear opening and placing at an optimal position relative to said collimating and tapping means.

* * * * *